(12) United States Patent
Robertsson

(10) Patent No.: US 7,742,876 B2
(45) Date of Patent: Jun. 22, 2010

(54) WAVEFIELD DECOMPOSITION FOR CROSS-LINE SURVEY

(75) Inventor: Johan Olof Anders Robertsson, Oslo (NO)

(73) Assignee: WesternGeco L.L.C., Houston, TX (US)

( * ) Notice: Subject to any disclaimer, the term of this patent is extended or adjusted under 35 U.S.C. 154(b) by 187 days.

(21) Appl. No.: 10/593,599

(22) PCT Filed: Mar. 29, 2005

(86) PCT No.: PCT/GB2005/001205

§ 371 (c)(1),
(2), (4) Date: Jul. 16, 2007

(87) PCT Pub. No.: WO2005/096017

PCT Pub. Date: Oct. 13, 2005

(65) Prior Publication Data

US 2008/0010022 A1    Jan. 10, 2008

(30) Foreign Application Priority Data

Apr. 3, 2004    (GB)    ................... 0407658.4

(51) Int. Cl.
G01V 1/16    (2006.01)
(52) U.S. Cl. ........................................................ 702/17
(58) Field of Classification Search .................. 702/5, 702/10, 11, 13, 14, 16, 17, 39, 54, 56, 66, 702/67, 69, 70, 75, 76, 77, 79, 85, 87, 104, 702/106, 152, 153, 182, 183, 189; 708/308; 367/13
See application file for complete search history.

(56) References Cited

U.S. PATENT DOCUMENTS

| 4,277,834 | A | * | 7/1981 | Garibotto | .................... 708/308 |
| 5,163,028 | A | * | 11/1992 | Barr et al. | ..................... 367/13 |
| 6,026,058 | A | | 2/2000 | Thomas | |
| 6,101,408 | A | | 8/2000 | Craine | |
| 6,101,448 | A | | 8/2000 | Ikelle et al. | |
| 6,446,009 | B1 | * | 9/2002 | Baeten et al. | ................. 702/17 |
| 6,654,693 | B2 | * | 11/2003 | Sen et al. | ..................... 702/17 |
| 6,668,228 | B1 | | 12/2003 | Özbek et al. | |
| 6,834,235 | B2 | * | 12/2004 | Muijs et al. | ................... 702/14 |
| 2003/0125880 | A1 | | 7/2003 | Fokkema | |

FOREIGN PATENT DOCUMENTS

| GB | 2381314 A | 4/2003 |
| WO | 01/53854 A1 | 7/2001 |
| WO | 2004/029662 A1 | 4/2004 |

OTHER PUBLICATIONS

Tuanyi et al., Seismic Data Time-Frequency Domain Filter with Wavelet Transform, 1997, IEEE International Conference on Intelligent Processing Systems, pp. 1223-1226.*

(Continued)

*Primary Examiner*—Mohamed Charioui

(57) ABSTRACT

It is described a method for spatially filtering 3D seabed seismic data acquired in a cross-line geometry including methods of how to decompose the data using a filter with two spatial components.

11 Claims, 5 Drawing Sheets

OTHER PUBLICATIONS

Amundsen 'Elimination of free-surface related multiples without need of the source wavelet' Geophysics, vol. 66 (1), 2001, pp. 327-341.

Amundsen et al 'Multiple attenuation and P/S splitting of multicomponent OBC data at a heterogenous sea floor' Wave Motion, 32, 2000, pp. 67-78.

Muijs et al 'Data-driven adaptive decomposition of multicomponent seabed readings' $73^{rd}$ Annual International Meeting: Society of Exploration Geophysicists, Dallas 2003.

Osen et al 'Towards optimal spatial filters for multiple attenuation and P/S splitting of OBC data'. EAGE $60^{th}$ Conference & Technical Exhibition, Germany, Jun. 8-12, 1998, 1-29, Geophysical Division.

Roesten et al 'Optimal non-recursive and recursive spatial filters for de-multiple of OBS data' $72^{nd}$ International Meeting: Society of Exploration Geophysicists, Salt Lake City 2002.

Schalkwijk et al 'Application of two-step decomposition to multi-component ocean-bottom data: theory and case study' Journal of Seismic Exploration, vol. 8, 1999, pp. 261-278.

Van Manen et al 'Decomposition and calibration of multi-component data in the common shot domain' EAGE $66^{th}$ Conference & Exhibition, France, Jun. 7-10, 2004, D026.

Vermeer '3D symmetric sampling', Seismic Acquisition 3: 3-D Data Acquisition SA3.1 $64^{th}$ Annual International Meeting: Society Of Exploration Geophysicists, 1994, pp. 906-909.

* cited by examiner

WAVEFIELD DECOMPOSITION FOR CROSS-LINE SURVEY

CROSS-REFERENCE TO RELATED APPLICATIONS

This application claims the benefits of priority from:
i) Application Number 0407658.4, entitled "WAVEFIELD DECOMPOSITION FOR CROSS-LiNE SURVEY," filed in the United Kingdom on April 3, 2004; and
ii) Application Number PCT/GB2005/001205, entitled "WAVEFIELD DECOMPOSITION FOR CROSS-LINE SURVEY," filed under the PCT on Mar. 29, 2005;

All of which are commonly assigned to assignee of the present invention and hereby incorporated by reference in their entirety.

The present invention generally relates to apparatus for and methods of processing seismic data. It particularly relates to methods of performing a decomposition of a seismic wavefield into components such as up- and downgoing wavefield constituents, shear (S) and compressional (P) waves and/or other constituents of interest, where the wavefield is obtained through a cross-line survey.

BACKGROUND OF THE INVENTION

In the field of seismic exploration, the earth interior is explored by emitting low-frequency, generally from 0 Hz to 200 Hz, acoustic waves generated by seismic sources. Refractions or reflections of the emitted waves by features in subsurface are recorded by seismic receivers. The receiver recordings are digitized for processing. The processing of the digitized seismic data is an evolved technology including various sub-processes such as noise removal and corrections to determine the location and geometry of the features which perturbed the emitted wave to cause reflection or refraction. The result of the processing is an acoustic map of the earth interior, which in turn can be exploited to identify for example hydrocarbon reservoirs or monitor changes in such reservoirs.

Seismic surveys are performed on land, in transition zones and in a marine environment. In the marine environment, surveys include sources and receiver cables (streamers) towed in the body of water and ocean bottom surveys in which at least one of sources or receivers are located at the seafloor. Seismic sources and/or receivers can also be placed into boreholes.

The known seismic sources include impulse sources, such as explosives and airguns, and vibratory sources which emit waves with a more controllable amplitude and frequency spectrum. The existing receivers fall broadly speaking into two categories termed "geophones" and "hydrophones", respectively. Hydrophones record pressure changes, whereas geophones are responsive to particle velocity or acceleration. Geophones can recorded waves in up to three spatial directions and are accordingly referred to as 1C, 2C or 3C sensors. A 4C seismic sensor would be a combination of a 3C geophone with a hydrophone. Both types of receivers can be deployed as cables with the cable providing a structure for mounting receivers and signal transmission to a base station.

The spatial distribution of source and receiver locations in a seismic survey is referred to as layout or spread. A variety of spreads are known. Among those are spreads where receiver lines, a one-dimensional array of receiver locations, and source lines, the corresponding array of source or shot locations, are laid out at an angle. For the purpose of this invention, such layouts are referred to as "cross-line" geometry or acquisition. Such acquisitions have been described for example by G.L.O Vermeer, in "3D Symmetric Samplings", 64th Ann. Internat. Mtg: Soc. of Expl. Geophys. (1994), 906-909 and later in the U.S. Pat. No. 6,026,058.

Seismic energy acquired at a receiver may contain upwardly and/or downwardly propagating seismic energy depending on the location of the receiver and on the event. For example seismic energy when it is incident (travelling upwardly) on the water-seabed interface, be partly transmitted into the water column and partially reflected back into the seabed. Thus, a seismic event will consist purely of upwardly propagating seismic energy above the seafloor, but will contain both upwardly and downwardly propagating seismic energy below the seafloor. As another example, seismic energy when incident on the water-air interface at sea level will be reflected back into the water column generating so-called "ghost" events. It is therefore often of interest to decompose the seismic data acquired at the receiver into an up-going constituent and a down-going constituent.

Various filters that enable decomposition of seismic data into up-going and down-going constituents have been proposed. For example in "Application of Two-Step Decomposition to Multi-Component Ocean-Bottom Data: Theory and Case Study", J. Seism. Expl. Vol. 8, 261-278 (1999), K. M. Schalkwijk et al have suggested that the down-going and up-going constituents of the pressure just above the seafloor may be expressed as:

$$P^-(f, k_x, k_y) = \frac{1}{2} P(f, k_x, k_y) - \frac{\rho}{2q(f,k)} v_z(f, k_x, k_y), \quad [1]$$

$$P^+(f, k_x, k_y) = \frac{1}{2} P(f, k_x, k_y) + \frac{\rho}{2q(f, k_x, k_y)} v_z(f, k_x, k_y),$$

where P is the pressure acquired at the receiver, $P^-$ is the up-going constituent of the pressure above the seafloor, $P^+$ is the down-going constituent of the pressure above the seafloor, f is the frequency, $k_x$, $k_y$ are the horizontal wavenumbers, $v_z$ is the vertical particle velocity component acquired at the receiver, $\rho$ is the density of the water, and q is the vertical slowness in the water layer.

As can be seen, the expressions in equation [1] require two of the components of seismic data recorded at the receiver to be combined. These expressions are examples of combining two components of the acquired seismic data. It may also be necessary to combine two or more components of the acquired seismic data in order to decompose the acquired seismic data into P-wave and S-wave components, or to remove water level multiple events from the seismic data.

Further separation methods including free-surface multiple removal above the seafloor, wavefield decomposition into up- and downgoing constituents or P/S events above and below the surface, the splitting of particle velocities and traction are described in a number of published documents.

In U.S. Pat. No. 6,101,408, the ocean bottom wavefield separation described in three dimensions using an analytical solution. However, for practical applications, the filter is reduced to one dimension. A number of decomposition equations for various separations are developed by Amundsen et al. in the above cited U.S. Pat. No. 6,101,408 and in: "Multiple attenuation and P/S splitting of multicomponent OBC data at a heterogeneous sea floor", Wave Motion 32 (2000), 67-78. A further review of decomposition methods for use in connection with the present invention is presented by L.

Amundsen in: "Elimination of free-surface related multiples without need of the source wavelet", Geophysics, Vol. 66, No. 1 (Jan-Feb 2001), 327-341.

Approximated compact spatial filters are further described by Osen et al. in: Towards Optimal Spatial Filters for Multiple Attenuation and P/S-Splitting of OBC Data", EAGE 60$^{th}$ conference, Leipzig, Germany, 8-12 Jun. 1998, 1-29 Geophysical Division. A short length filter is obtained in terms of powers of $k_x$ using a series expansion.

When applying three-dimensional (3D) wavefield decomposition methods to data acquired in a cross-line geometry and sorted into 1-fold bins of common mid-points (CMPs) distributed evenly in a finely spaced "carpet" determined by in-line source and receiver spacings as proposed by Vermeer, it was noted that the known filter introduce an unacceptable level of noise due to sensor variations, statics and other perturbations.

In the light of the above prior art, it is seen as an object of the present invention to provide filters applicable to cross-line acquisitions or data collected through cross-line acquisitions and methods of applying such filters.

SUMMARY OF THE INVENTION

According to a first aspect of the invention there is provided a method of decomposing a seismic wavefield, wherein a 3D wavefield is obtained by a cross-line acquisition and filtered applying a decomposition filter having two spatial components or filtering in two spatial directions to obtain a decomposed representation of the wavefield.

A 3D wavefield for the purpose of this invention involve obtaining data or time series of measured parameters over an area. Hence, such data are acquired as series of ideally closely spaced parallel lines. The parameters measured are preferable velocity and pressure data.

In the cross-line acquisition shot lines and receiver lines enclose an angle, which is preferably around 90 degrees.

The method of this invention can be applied to any of the existing decomposition equations that include a filter term depending on the vertical wavenumber $k_z$. Such decompositions preferable include up-/down going decomposition, P/S decomposition, elastic decomposition and acoustic decomposition.

The filter of the present invention has two spatial components that when represented in an analytical form are written as $k_x$ and $k_y$, or as spatial derivatives in x and y, respectively. When implemented as machine program these filters are approximated by finite differences.

The filter is preferably a cascaded filter of 1D spatial filters that are applied sequentially.

The filter is preferably a compact filter having a finite length or support in in-line and cross-line direction. When analytically derived, wavefield decomposition filters have infinite extent or support in space and in time. The filter operations generally assume stationary medium properties or in the case of deghosting a locally flat sea surface (both in time and space). The main advantage of introducing compactness is to ensure that medium properties (or sea surface variations) are constant across the aperture (or two dimensional support) of the filter. For the seabed wavefield decomposition filters the full analytical expression of the filter can be written in the frequency wavenumber domain for instance. The infinite support in time can be maintained since medium properties do not vary with time. However, in the spatial directions Taylor expansions of the filter into factors $k_x$, $k_x{}^2$, $k_x{}^3$, ..., $k_y$, $k_y{}^2$, $k_y{}^3$, ... are proposed. When going back to the spatial domain each factor $k_x$ or $k_y$ or its powers simply correspond to a derivative in the x- and y-directions respectively. Spatial derivatives can in turn be implemented with compact local support using 2-point, 3-point, 5-point, or more extended FD approximations. However, there are also other ways of designing compact filters without necessarily relating them to spatial derivatives.

Preferably the spatial filter of the present invention is applied exclusively to the measured pressure wavefield $P(f, k_x, k_y)$. The pressure measurement is usually less sensitive to mismatch in the response of the various receivers used to record the wavefield.

It is furthermore advantageous to use a calibration for matching geophone recordings with hydrophone recordings prior to the decomposition filtering, particularly in case the filter operates on the particle velocity $(v_x, v_y, v_z)$ After the decomposition filter is applied it is possible to remove multiples or proceed with other known steps to obtain an image of sub-surface; including migration and other methods known in the art.

These and other aspects of the invention will be apparent from the following detailed description of non-limitative examples and drawings.

EXAMPLES

Figure 1A:
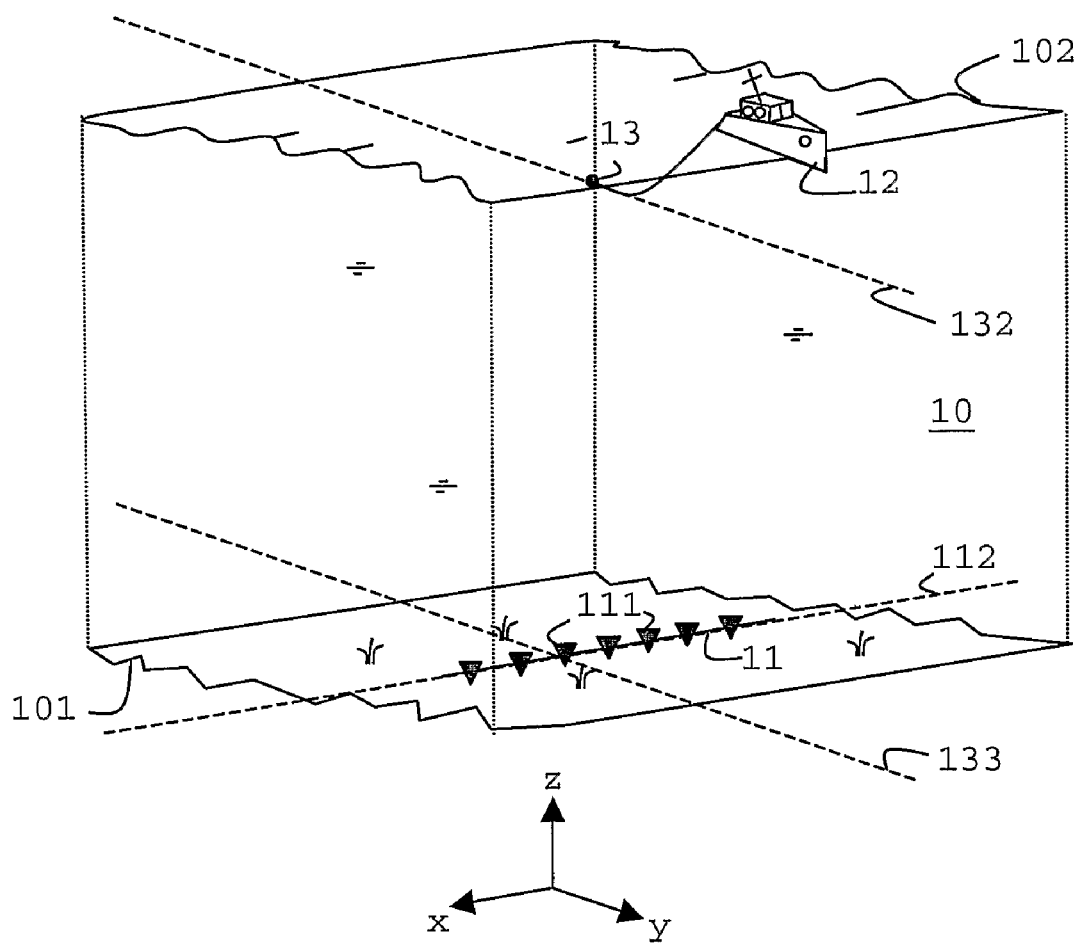
FIG. 1A illustrates an ocean bottom acquisition of a 3D seismic wavefield using an OBC and a source towed by a seismic vessel.

In FIG. 1A there is illustrated an example of a seismic survey in cross-line geometry. The survey is a marine seismic survey in a body of water 10 between a seafloor 101 and a sea surface 102. A receiver cable 11 with a plurality of receivers 111 is laid out on the seafloor 101. The receivers 111 are preferably 4C sensors, though, as will be apparent from the following description, the sensors may comprise a 1C geophone and a hydrophone only, being thus capable of recording at least the vertical component of velocity and pressure at seafloor level.

A seismic vessel 12 tows a marine seismic source 13 close to the sea surface 102. The airgun 13 emits at precisely determined time intervals an impulse of acoustic energy referred to as "shot". A dashed line 132 indicates the path of the towed airgun 13. The projection 133 of the dashed line 132 onto the seafloor 102 intersects the receiver line 112 at approximately 90 degrees. Though it is preferable to aim for a near-orthogonal orientation of receiver lines to shot lines, deviations are inevitable under real survey conditions. To facilitate the following description the receiver line or in-line direction is denoted as x direction, the shot-line or cross-line direction is marked as y direction and the vertical direction is taken as the z direction.

During a survey, the sources 131 are fired at intervals and the receivers 121 "listen" within a frequency and time window for acoustic signals such as reflected and/or refracted signals that are caused features in path of the emitted wavefield. After shooting a line, the vessel performs a u-turn in order to shoot a subsequent line usually with an offset in receiver line or x direction.

Figure 1B:
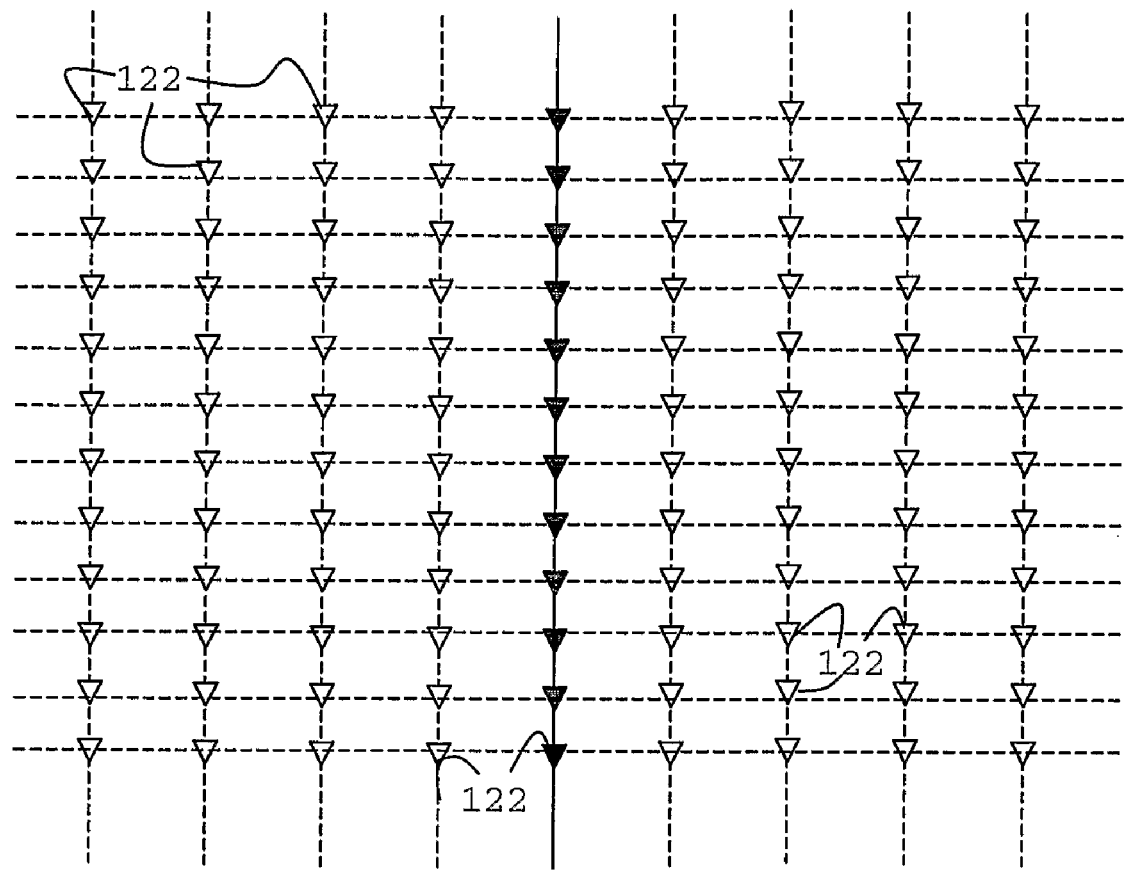
FIG. 1B illustrates the spread of data point after shooting a single shot line of the acquisition of FIG. 1A.

In the general practice, it is assumed that Green's functions which describe the wave propagation between source and receiver points are invariant for translation of the source and receiver in the cross-line direction. Hence, an offset between shooting lines can be regarded as an equal shift of the receiver line. As a result, data points obtained from a single source cross-line form a carpet on the seafloor, which is illustrated in FIG. 1B. In FIG. 1B, the triangles 122 denote the location of data points. As the wavefield is recorded in two spatial dimensions and in time, the resulting data are referred to as 3D wavefield.

Figure 1C:
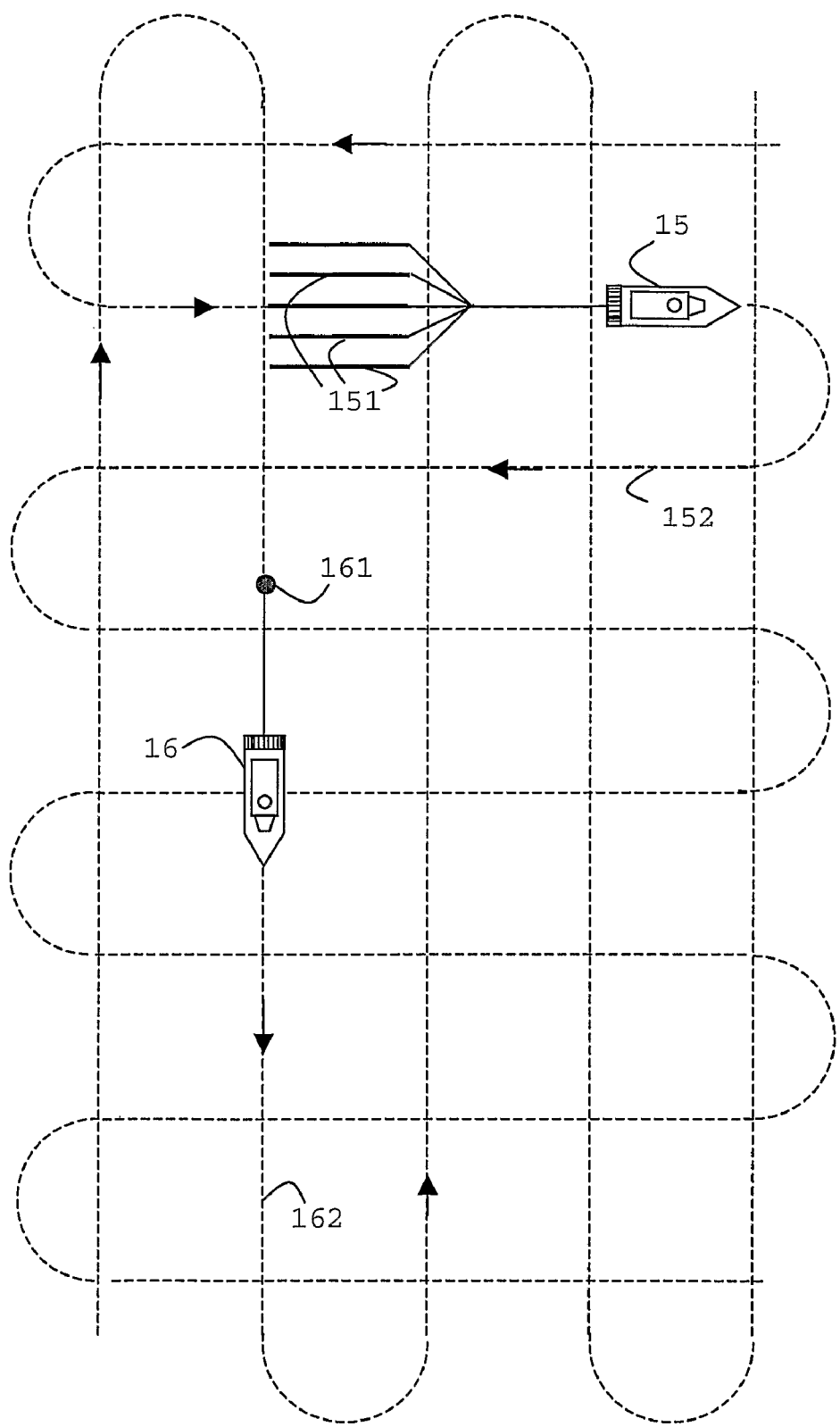
FIG. 1C illustrates the acquisition of 3D seismic wavefield using streamers towed by a first vessel and a source towed by a second seismic vessel.

In FIG. 1, there is shown a schematic cross-line marine survey with two vessels. A first vessel 15 tows five streamers 151 below the sea surface following a path 152. Simultaneously, a second vessel 16 on path 162 tows a seismic source 161 below the surface. As above in FIG. 1A, the resulting shot and receiver lines are essentially orthogonal to each other.

Figure 2:
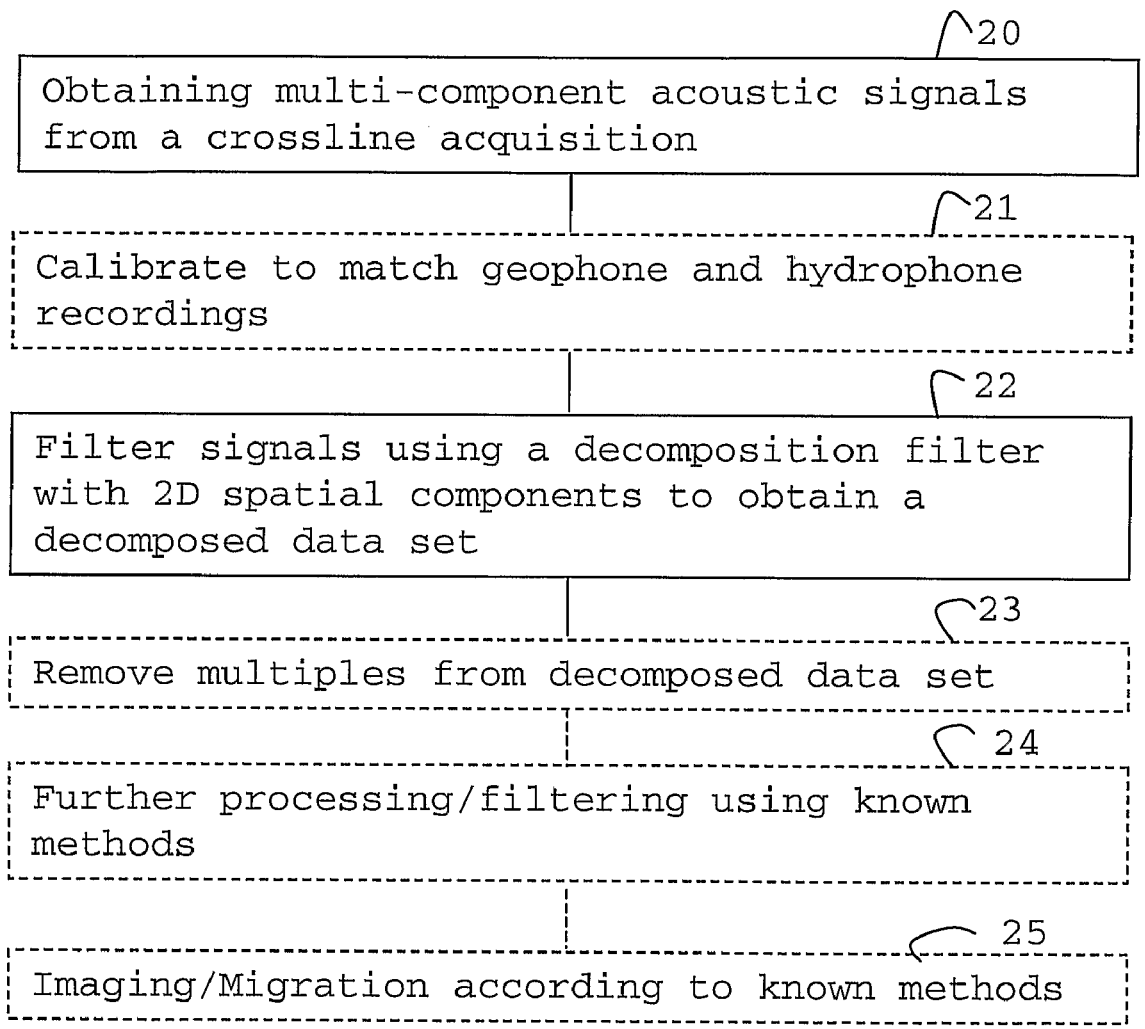
FIG. 2 is a diagram illustrating steps in accordance with an example of the invention.

In the following description and the accompanying FIG. 2, steps are described leading to a decomposition of the 3D wavefield into up- and downgoing components.

After obtaining 20 the wavefield data set as acquired through the seismic receivers, the data are first preferably calibrated 21 to compensate for the differences between geophone and hydrophone recordings. Any suitable calibration may be used including for example the methods described in the International patent application PCT/GB03/04190. Following those methods, the calibration can be done using an in-line shot-line for the P, $v_z$ and $v_z$ $$k_z(f, k_x, k_y) = \sqrt{(2\pi f/c)^2 - k_x^2 - k_y^2},$$ [3]

is the absolute value of the vertical wavenumber expressed in terms of horizontal wavenumbers in the in-line direction $k_x$ and the cross-line direction $k_y$, and the velocity c of the recording medium. It should be noted that the decomposition could also be achieved by computing the up-going component of the recorded pressure P$^-$ using equations [1], leading expression which include terms of $1/k_z$. Such terms can be approximated using similar expansions as described below.

In known decomposition methods using any of the above equations [1, 2], the cross-line or y-directions is mostly ignored or a radial symmetry is assumed, with the vertical wavenumber then being computed using an approximation based exclusively on a one-dimensional direction, i.e. the in-line wavenumber $k_x$ or the radial wavenumber $k_r$. When 3D effects of the sub-surface or acquisition geometry are significant, such approximations are no longer valid.

Equations as those described herein can be implemented in the common mid-point domain, which is proposed by Vermeer (1994) and Thomas (2000). It is however fruitful to rewrite or approximate equation [3] into a form constituting a cascade (sum or product) of one-dimensional (1D) spatial filters acting in the x- or y-directions only. This represents a computationally attractive way of filtering the data (both in terms of CPU and resorting data between different domains). One way to obtain filters of this form is to make suitable Taylor expansions of the horizontal wavenumbers in the square-root term around zero wavenumbers. components and using a cross-line shot-line for the $v_y$ component.

Acoustic wavefield decomposition 22 is usually carried out on the pressure component P (involving spatial filtering of $v_z$). Instead in this example decomposition filters are applied to the vertical geophone component $v_z$ (involving spatial filtering of P). The advantage of this example is that the spatial components of the filter only act on P as shown in PCT/GB03/04190.

Accordingly, acoustic wavefield decomposition into up- and down-going constituents above the seafloor can be achieved by solving the following equation:

$$v_z^{\pm}(f, k_x, k_y) = \frac{1}{2}a(f)v_z(f, k_x, k_y) \pm \frac{k_z(f, k_x, k_y)}{2\rho\omega}P(f, k_x, k_y)$$ [2]

In equation [2], a(f) denotes the optional frequency-dependent calibration filter that corrects for imperfections in the recording of the geophones, $v_z^-$ denotes the up-going constituent of the vertical component of particle velocity, and $v_z^+$ denotes the down-going constituent of the vertical component of particle velocity. The velocity $v_z$ is the recorded or estimated vertical component of particle velocity in the frequency f—wavenumber domain, P(f, $k_x$, $k_y$) is the recorded pressure, and $\rho$ is the density in the recording medium.

The term $k_z$, which can be expressed as

This approximation remains valid for data corresponding to propagating waves at $k_x^2 + k_y^2 < (2\pi f/c)^2$.

The expression for the vertical wavenumber can be rewritten and expanded in $k_x$ and $k_y$ to produce a few different alternative expansions that can be implemented using a cascade of filters that only act in the cross-line or in-line direction one at a time:

$$k_z(f, k_x, k_y) \approx \sqrt{(2\pi f/c)^2 - k_x^2} \left( 1 - \frac{k_y^2}{2((2\pi f/c)^2 - k_x^2)} - \frac{k_y^4}{8((2\pi f/c)^2 - k_x^2)^2} + O(k_x^6, k_y^6) \right)$$ [4a]

$$k_z(f, k_x, k_y) \approx 2\pi f/c \left( 1 - \frac{k_x^2 + k_y^2}{2(2\pi f/c)^2} - \frac{2k_x^2 + k_y^2 + k_x^4 + k_y^4 +}{8(2\pi f/c)^4} + O(k_x^6, k_y^6) \right)$$ [4b]

$$k_z(f, k_x, k_y) \approx \sqrt{(2\pi f/c)^2 - k_x^2} + \sqrt{(2\pi f/c)^2 - k_y^2} - 2\pi f/c \left( 2 + \frac{2k_x^2 k_y^2}{8(2\pi f/c)^4} + O(k_x^6, k_y^6) \right)$$ [4c]

Equations [4a-4c] represent different ways to proceed with an implementation of the filter with two spatial components that only rely on being able to filter the data along two perpendicular spatial directions one at a time which is exactly what can be achieved using the method described above in a cross-line geometry. Note that this does not mean that only a "cross" of mid-points are used in filtering the data. All cross-terms of multiplications of terms with different horizontal wavenumbers will result in a "virtual" carpet of data being used of dimension of the length of the spatial filters in both directions.

After the decomposition 22, multiples could be removed 23 from the data set. Further processing steps and/or filtering steps 24 could be performed on the decomposed data set. Using what is commonly referred to as imaging or migration 25 the data set can be further processed to yield an image of subterranean layers. These images are used for hydrocarbon exploration and reservoir characterization. The optional steps 21 and 23-25 are indicated in FIG. 2 as dashed blocks.

Figure 3:
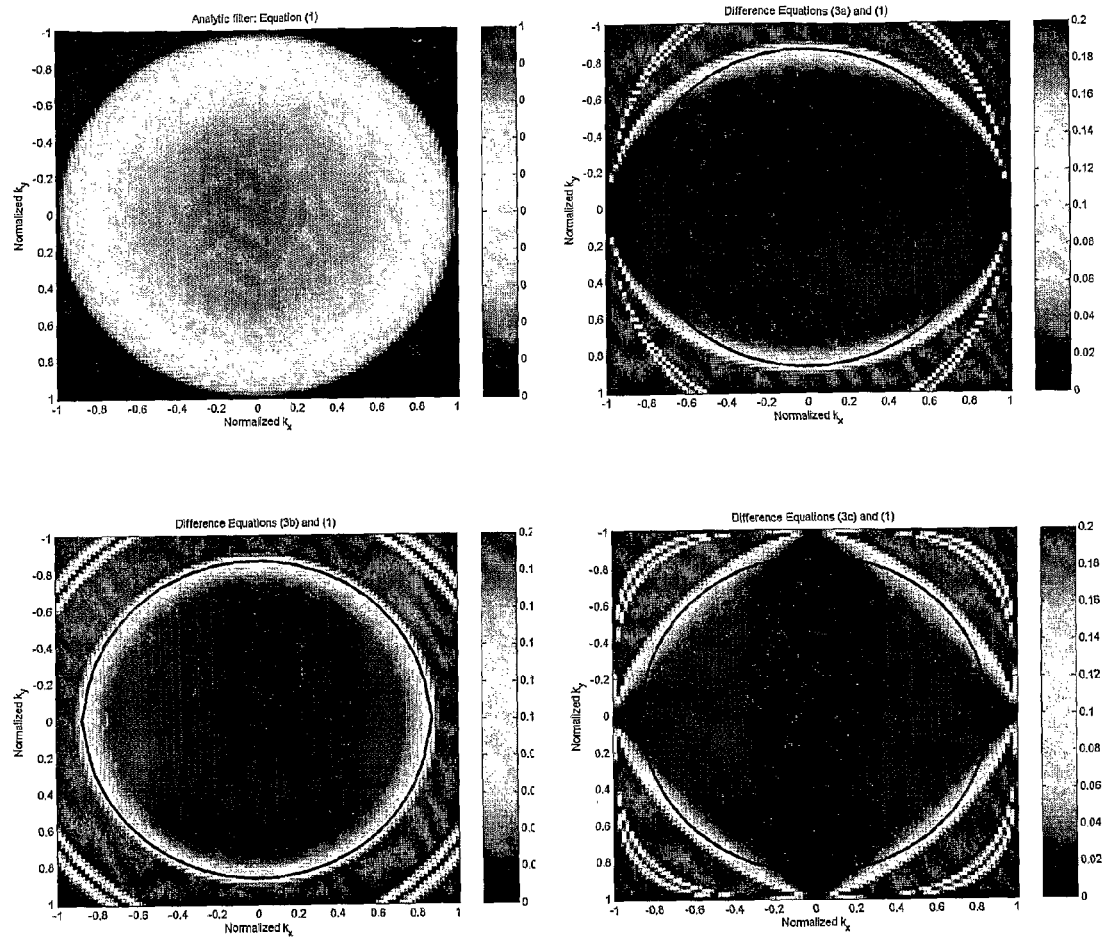
FIG. 3 compares the performance of filter approximations s in accordance with examples of the invention.

FIG. 3 shows a panel of the exact wavefield decomposition filter using equation [3] in the top left, difference between equation [3] and the filter approximation [4a] in the top right, difference between equation [3] and the filter approximation [4b] in the bottom left, and difference between equation [3] and the filter approximation [4c] in the bottom right. Note that these plots only assess the accuracy of the filter approximations and do not include the error due to their discretization. In other words, the plots do not show inaccuracies related to how the different terms in the spatial filter approximations [4a-4c] are implemented (e.g., using 3-point or 5-point derivative approximation). This would of course introduce a dependence on frequency as well. However, this is of secondary importance as appropriate approximations that are sufficiently accurate are straightforward to find.

From the top right of FIG. 3, it can be seen that equation [4a] which was obtained by making a Taylor expansion in the y-direction only results in the best approximation of the three examples for azimuths close to the in-line cable direction. Equation [4b] which is used in the difference plot at the bottom left of FIG. 3 results in an approximation which is equally good along all azimuths. An advantage with this filter is that it can be fully implemented as a compact filter. Equation [4c] which is used in the difference plot at the bottom right of FIG. 3 results in a fully accurate approximation both along the in-line and cross-line azimuths. The filter can be implemented using a compact filter approximation for the cross-term only. Exactly which of the alternative implementation [4a-4c] that is most attractive may vary depending on different combinations of requirements in terms of computational cost (CPU and data access) and accuracy.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

The above approximations or similar approximations can be used for example with the separations developed by Amundsen et al. in the above cited U.S. Pat. No. 6,101,408 or in: "Multiple attenuation and P/S splitting of multicomponent OBC data at a heterogeneous sea floor", Wave Motion 32 (2000), 67-78. In the latter document, demultiple or decomposition equations are found for elastic decomposition (particle velocity, traction) or P/S wave splitting below the sea floor.

The invention claimed is:

1. A method for marine seismic data acquisition, comprising:
   obtaining a 3D wavefield by cross-line acquisition using one or more marine seismic sources and a plurality of marine seismic receivers arranged into one or more lines, wherein:
      the one or more marine seismic sources are towed behind a seismic vessel in an essentially orthogonal direction relative to the one or more lines of the marine seismic receivers;
      the one or more marine seismic source are fired at intervals as the one or more mariner seismic sources are towed orthogonally with respect to the one or more lines of the marine seismic receivers; and
      an offset between shooting locations of the one or more seismic sources is regarded as an equal shift of the line of seismic receivers; and
   decomposing the obtained seismic wavefield by applying a decomposition filter having two spatial directions to obtain a decomposed wavefield, wherein the decomposition filter is applied as a cascaded filter.

2. The method of claim 1 wherein the decomposition is for at least one of a group consisting of up- or down going decomposition, P/S decomposition, elastic decomposition and acoustic decomposition.

3. The method of claim 1 wherein the filter comprises in-line component ($k_x$) and cross-line component ($k_y$) or a spatial representation of the in-line component ($k_x$) and cross-line component ($k_y$).

4. The method of claim 1 wherein the filter is a compact filter.

5. The method of claim 1 wherein the filter filters an obtained pressure wavefield.

6. The method of claim 1 wherein the filter exclusively filters an obtained pressure wavefield.

7. The method of claim 1 wherein the step of applying the filter is preceded by a calibration step to match geophone recordings with hydrophone recordings.

8. The method of claim 1 wherein the step of applying the filter is followed by a step of removing multiples from a component of the decomposed wavefield.

9. The method of claim 1 wherein the step of applying the filter is followed by a step of imaging or migrating the filtered wavefield to generate an image of subterranean formations.

10. The method of claim 1 wherein the wavefield is obtained through receivers located on the sea floor.

11. The method of claim 1 wherein the wavefield is obtained through receivers towed by a vessel.

* * * * *